United States Patent [19]

Blakely

[11] Patent Number: 5,028,659

[45] Date of Patent: Jul. 2, 1991

[54] IMPACT RESISTANT POLYMER BLENDS

[75] Inventor: Dale M. Blakely, Kingsport, Tenn.

[73] Assignee: Eastman Kodak Company, Rochester, N.Y.

[21] Appl. No.: 361,469

[22] Filed: Jun. 5, 1989

[51] Int. Cl.$^5$ .................... C08L 51/02; C08L 67/02
[52] U.S. Cl. ......................................... 525/92; 525/95
[58] Field of Search ............................ 525/64, 92, 95

[56] References Cited

U.S. PATENT DOCUMENTS

| | | | |
|---|---|---|---|
| 3,564,077 | 2/1971 | Brinkmann et al. | 260/873 |
| 3,644,574 | 2/1972 | Jackson, Jr. et al. | 263/873 |
| 3,919,353 | 11/1975 | Castelnuovo et al. | 260/873 |
| 4,011,286 | 3/1977 | Seymour et al. | 260/873 |
| 4,096,202 | 6/1978 | Farnham et al. | 260/873 |
| 4,117,034 | 9/1978 | Steffancin | 260/873 |
| 4,349,469 | 9/1982 | Davis et al. | 524/765 |
| 4,352,907 | 10/1982 | Lee | 524/537 |
| 4,508,870 | 4/1985 | Dufour et al. | 525/64 |
| 4,582,876 | 4/1986 | Weemes et al. | 525/64 |
| 4,657,971 | 4/1987 | Shiraki et al. | 525/64 |

FOREIGN PATENT DOCUMENTS

| | | |
|---|---|---|
| 0101427 | 2/1984 | European Pat. Off. . |
| 3332325 | 3/1985 | Fed. Rep. of Germany . |
| 2323738 | 4/1977 | France . |
| 53-071155 | 6/1978 | Japan . |

OTHER PUBLICATIONS

Chemical Abstracts, vol. 112, No. 24, 11 Jun. 1990, pp. 64–65, Abstract No. 218385g, Columbus, Ohio, U.S.; & U.S. Pat. No. 4,897,453 (T. E. Flora et al.) (the whole abstract).

*Primary Examiner*—Allan M. Lieberman

[57] ABSTRACT

Disclosed is a polymer blend of a copolyesterether and a styrene-butadiene copolymer, molded articles of which have improved impact strength.

6 Claims, No Drawings

IMPACT RESISTANT POLYMER BLENDS

TECHNICAL FIELD

This invention relates to blends of styrene-butadiene copolymers with certain copolyesterethers which have improved impact strengths. These blends are useful as molding compositions.

BACKGROUND OF THE INVENTION

U.S. Pat. No. 4,582,876 describes blends of copolyesters and styrene-butadiene-maleic anhydride copolymers that have high impact at low temperatures. That disclosure did not make the present discovery obvious, however, since that styrenic polymer had rubbery inclusions that were believed to cause the high impact strengths of the blends. The morphology of the styrene-butadiene of the present invention is not similar to that disclosed in the '876 patent and was not expected to result in high impact strengths when blended with polyesters.

Also of interest are U.S. Pat. Nos. 4,117,034; 3,644,574; 4,352,907; 3,564,077; 4,096,202; 3,919,353; German Patent No. 3,332,325, and Japanese Patent No. 5371155.

DESCRIPTION OF THE INVENTION

According to the present invention, there are provided polymer blends which have improved impact strengths comprising I. about 10–95 wt % of a copolyesterether having an I.V. of about 0.8–1.4 dl/g and containing repeat units from
  A. a dicarboxylic acid component consisting essentially of 1,4-cyclohexanedicarboxylic acid having a trans isomer content of at least 70%, preferably at least 80%,
  B. a glycol component consisting essentially of
    1. about 75–96 mol % of 1,4-cyclohexane-dimethanol, preferably having a trans isomer content of at least 60%, and
    2. about 25–4 mol % from (about 15 to 50 wt %, based on the weight of the polyesterether), of poly(tetra-methylene ether) glycol (PTMG) having a molecular weight of about 500 to 1100, and
  C. from 0 to about 1.5 mol %, based on the mole % of the acid or glycol component, of a branching agent having at least three functional groups consisting of COOH and/or OH and from 3 to 60 carbon atoms, and II. about 90–5 wt % of a styrene-butadiene block copolymer containing about 10–40 wt % repeat units from butadiene, the copolymer having a flow rate of about 6–12 g/min.

The dicarboxylic acid component of the polyesterether of this invention consists essentially of 1,4-cyclohexanedicarboxylic acid having a trans isomer content of at least 70 percent, preferably at least 80 percent, and most preferably, at least 85 percent trans isomer content.

1,4-Cyclohexanedicarboxylic acid and 1,4-cyclohexanedimethanol are well known in the art and commercially available. "Man-Made Fibers: Science and Technology," Vol. III, edited by Mark, Atlas, and Cernia, published by Interscience Publishers describes preparation of 1,4-cyclohexanedicarboxylic acid and 1,4-cyclohexanedimethanol at page 85.

The poly(oxytetramethylene) glycol component of the polyesterether is commercially available, and is prepared by well known techniques. The poly(oxytetramethylene) glycol has a molecular weight of between about 500 and about 1100, preferably about 1000 (weight average).

The polyesterether further may comprise up to about 1.5 mole percent, based on the acid or glycol component, of a polybasic acid or polyhydric alcohol branching agent having at least three COOH or OH functional groups and from 3 to 60 carbon atoms. Esters of many such acids or polyols may also be used. Suitable branching agents include trimellitic acid or anhydride, trimesic acid, trimethylol ethane, trimethylol propane, and trimer acid.

It should be understood that the total acid reactants should be 100 percent, and the total glycol reactants should be 100 mole percent. Although the acid reactant is said to "consist essentially of" 1,4-cyclohexanedicarboxylic acid, if the branching agent is a polybasic acid or anhydride, it will be calculated as part of the 100 mol percent acid. Likewise, the glycol reactant is said to "consist essentially of" 1,4-cyclohexanedimethanol and poly(oxytetramethylene) glycol, if the branching agent is a polyol, it will be calculated as part of the 100 mol percent glycol.

The polyesterethers preferably include a phenolic antioxidant. It is preferred that the phenolic antioxidant be hindered and relatively nonvolatile. Tetrakis[methylene(3,5-di-tert-butyl-4-hydroxyhydrocinnamate)-methane]which is commercially available from Ciba-Geigy Chemical Company as Irganox 1010 antioxidant, is preferred. Preferably, the antioxidant is used in an amount of from about 0.1 to about 1.0, based on the weight of copolyesterether.

The trans and cis isomer contents of the final copolyesterether are controlled in order to give polymers that setup or crystallize rapidly. Cis and trans isomer contents are measured by conventional methods well known to those skilled in the art. See, for example, U.S. Pat. No. 4,349,469.

The polyesterether used in this invention may be prepared by conventional techniques. See, for example, U.S. Pat. No. 4,349,469. It should be understood that the support sheet may contain stabilizers, colorants, processing aids, reinforcing materials such as glass fibers, flame retardants, etc.

The styrene-butadiene block copolymers useful in the blends of this invention are those having repeat units from about 10–40 wt % butadiene and about 90–60 wt % styrene, and a melt flow rate of 6–12 g/10 min. Such copolymers may be produced using conventional copolymerization processes, and many are commercially available such as, for example, KR03 K-Resin from Phillips.

The blends can be melt blended and injection molded on conventional processing equipment. The resulting parts have unexpectedly good low-temperature impact strengths and good tensile strength, ductility, flexural properties, and heat distortion temperatures. For the blends described here, all ratios of the components have higher 0° C. notched Izod impact values than do either of the neat components. These blends are useful as injection molded articles with good toughness and ductility.

The following examples are submitted for a better understanding of the invention.

KR03 K-Resin, a styrene-butadiene copolymer marketed by Phillips, is blended with a copolyesterether with an inherent viscosity of about 1.23. It is composed of cyclohexanedicarboxylic acid and cyclohexanedimethanol with 0.5 mol % trimellitic anhydride. It also contains 8.9 mol % poly(tetramethylene ether) glycol, which is equivalent to 25 wt %. The blends contain 25, 50, and 75 wt % K-Resin. In the examples, KR03 K-Resin, a styrene-butadiene block copolymer (SB copolymer) having repeat units of about 25 wt % butadiene and about 75 wt % styrene, having a melt flow rate of 8 is used. They are compounded on a Werner & Pfleiderer twin-screw extruder and molded on a Boy 22S molding machine at 230° C. with a 23° C. mold. The mechanical properties are shown in Table 1. The 0° C. and 23° C. notched Izod impact strengths are shown in FIG. 1. The impact strengths of the blends are unexpectedly higher than the impact strengths of either neat component. These remarkable impact strengths are displayed over a broad range of useful tensile and flexural properties.

In the table, the letters C, P and N under impact strengths have the following meanings:

C —complete break
P —partial break
N —no break

In the examples, the following blends are used:

| Example | % SB Copolymer | % Copolyesterether |
|---|---|---|
| 1 | 100 | 0 |
| 2 | 75 | 25 |
| 3 | 50 | 50 |
| 4 | 25 | 75 |
| 5 | 0 | 100 |

TABLE I

|  | Example | | | | |
|---|---|---|---|---|---|
|  | 1 | 2 | 3 | 4 | 5 |
| Molding Temperature, °C. | 230 | 230 | 230 | 230 | 230 |
| Injection Pressure, psig | 400 | 300 | 300 | 400 | 600 |
| Tensile | | | | | |
| Yield Stress, 10E3 psi | 4.13 | 3.29 | — | — | — |
| Break Stress, 10E3 psi | 5.08 | 5.09 | 4.58 | 4.13 | 4.65 |
| Yield Elongation, % | 3 | 3 | — | — | — |
| Break Elongation, % | 193 | 179 | 128 | 94 | 75 |
| Flexural | | | | | |
| Strength, 10E3 psi | 5.48 | 4.33 | 3.17 | 2.02 | 1.07 |
| Modulus, 10E5 psi | 2.24 | 1.79 | 1.16 | .62 | .19 |
| Notched Izod Impact Strength, ft-lb/in. | | | | | |
| 23° C. | .55 C | 13.66 N | 13.69 N | 11.41 N | 8.46 N |
| 0° C. | .52 C | 13.08 N | 15.19 N | 13.61 N | 10.72 N |
| Unnotched Izod Impact Strength, ft-lb/in. | | | | | |
| 23° C. | 27.48 N | 21.46 N | 19.92 N | 11.56 N | 7.70 N |
| 0° C. | 26.61 N | 24.19 N | 23.25 N | 17.24 N | 12.13 N |
| −40° C. | 27.10 N | 26.56 N | 29.09 N | 25.45 N | 24.26 N |
| HDT, °C. | | | | | |
| 66 psi | 78 | 69 | 69 | 60 | 55 |
| 264 psi | 60 | 53 | 57 | 53 | 38 |

As used herein, the inherent viscosity (I.V.) is measured at 25° C. using 0.50 g of polymer per 100 mL of a solvent consisting of 60% by weight phenol and 40% by weight tetrachloroethane.

The tests used herein for determination of mechanical properties are described as follows:

| | |
|---|---|
| Melt Flow Rate of Index | ASTM D1238 (Condition G) |
| Tensile Strength at | ASTM D638-80 |

*-continued*

| | |
|---|---|
| Fracture | |
| Elongation at Fracture | ASTM D638-80 |
| Flexural Modulus | ASTM D790-80 |
| Flexural Strength | ASTM D790-80 |
| Izod Impact | ASTM D256-81 |
| Heat Deflection Temperature (HDT), °C. | ASTM D648-72 |

I claim:

1. A polymer blend having improved impact strengths comprising
   I. about 10–95 wt % of a copolyesterether having an I.V. of about 0.8–1.4 dl/g and containing repeat units from
      A. a dicarboxylic acid component consisting essentially of 1,4-cyclohexanedicarboxylic acid having a trans isomer content of at least 70%,
      B. a glycol component consisting essentially of
         1. about 75–96 mol % 1,4-cyclohexane-dimethanol,
         2. about 25–4 mol %, of poly(tetra-methylene ether) glycol having a molecular weight of about 500 to 1100, and
      C. from 0 to about 1.5 mol %, based on the mole % of the acid ro glycol component, of a branching agent having at least three functional groups consisting of COOH and/or OH and from 3 to αcarbon atoms, and
   II. about 90–5 wt % of a block copolymer consisting essentially of about 10–40 wt % repeat units from butadiene and about 90–60 wt % repeat units from sytrene, the copolymer having a flow rate of about 6–12 g/min.

2. The polymer blend of claim 1 containing about 40–70 wt % of said copolyester and about 60–30 wt % of said styrene-butadiene copolymer.

3. The polymer blend of claim 1 containing about 0.3–1.0 mol % of said branching agent.

4. A molded article of the composition of claim 1 having a notched Izod strength of greater than about 13 ft-lb/in. at 0° C.

5. A molded article of the composition of claim 2 having a notched Izod strength of greater than about 13 ft-lb/in. at 0° C.

6. A molded article of the composition of claim 3 having a notched Izod strength of greater than about 13 ft-lb/in. at 0° C.

* * * * *

UNITED STATES PATENT AND TRADEMARK OFFICE
CERTIFICATE OF CORRECTION

PATENT NO. : 5,028,659

DATED : July 2, 1991

INVENTOR(S) : Dale M. Blakely

It is certified that error appears in the above-identified patent and that said Letters Patent is hereby corrected as shown below:

Column 4, line 29, Claim 1, "αcarbon" should read --- 60 carbon ---

Signed and Sealed this

First Day of December, 1992

Attest:

DOUGLAS B. COMER

*Attesting Officer*      *Acting Commissioner of Patents and Trademarks*